United States Patent [19]

Burns et al.

[11] Patent Number: 4,908,857
[45] Date of Patent: Mar. 13, 1990

[54] ISOLATED DRIVE CIRCUIT

[75] Inventors: Robert V. Burns; Sanjay Gupta, both of Phoenix, Ariz.

[73] Assignee: Siemens Transmission Systems, Inc., Phoenix, Ariz.

[21] Appl. No.: 355,220

[22] Filed: May 22, 1989

[51] Int. Cl.⁴ ............................................ H04M 3/02
[52] U.S. Cl. ..................................... 379/418; 363/26
[58] Field of Search ...................... 363/16, 41, 26, 47; 379/413, 418, 373, 399, 382

[56] References Cited

U.S. PATENT DOCUMENTS

| | | |
|---|---|---|
| 4,161,633 | 7/1979 | Treiber . |
| 4,349,703 | 9/1982 | Chea, Jr. . |
| 4,351,060 | 9/1982 | Treiber . |
| 4,399,499 | 8/1983 | Butcher et al. . |
| 4,656,659 | 4/1987 | Butcher et al. . |
| 4,692,851 | 7/1987 | Attwood ................. 363/16 |
| 4,797,541 | 1/1989 | Billings et al. ........... 363/26 |

Primary Examiner—Jin F. Ng
Assistant Examiner—Randall S. Vaas
Attorney, Agent, or Firm—Jeffrey P. Morris

[57] ABSTRACT

The present invention provides a power drive circuit which is transformer isolated from the circuit developing the drive signals, but which does not lose its DC reference voltage. This technique results in the desired isolation without the undesirable possibility of operating the output transistors in an unsafe DC region, which is a particular problem when the output transistors are FET devices. In accordance with the present invention, pulse transformers are used to drive the power FET devices.

11 Claims, 4 Drawing Sheets

INPUT TO TRANSFORMER

OUTPUT OF TRANSFORMER

INPUT TO TRANSFORMER

OUTPUT OF TRANSFORMER

ORIGINAL PWM

PWMA

PWMB

INPUT TO THE
SYNCHRONOUS RECTIFIERS

ISOLATED DRIVE CIRCUIT

BACKGROUND OF THE INVENTION

The present invention relates generally to the field of telephone line circuits and more specifically to a power drive circuit that is transformer isolated from the circuit which derives the drive signals, while not losing the dc reference. The present invention also relates to a transformer coupled drive circuit capable of driving power enhancement mode type FET devices and is advantageously applicable to ringing generators, particularly to multifrequency ringing generators, and to power supplies.

2. Description of the Prior Art

It is well known that low frequency signals can be amplified by factors of one-hundred or more by using pulse-width modulation techniques. For example, a low frequency signal may be pulse-width modulated by a high frequency triangular waveform. Examples of this technique may be found in U.S. Pat. No. 4,349,703, entitled "Programmable Ring Signal Generator", issued Sept. 14, 1982 and in U.S. Pat. No. 4,656,659, also entitled "Programmable Ring Signal Generator", issued Apr. 7, 1987. The pulses are usually at digital logic level values and are amplified by a power amplifier. The power amplifier includes switching circuitry to convert the logic level pulses to higher voltage pulses, typically at high voltage levels of about 350 volts. The high voltage pulses are then low-pass filtered and the original low-frequency signal is retrieved. An example of a programmable signal generator for generating an electrically isolated output voltage for use in a telephone subscriber line circuit may be found in U.S. Pat. No. 4,161,633, entitled "Subscriber Line/Trunk Circuit", issued Jul. 17, 1989; wherein a signal processor compares an output signal to a reference signal for the purpose of deriving a pulse duration modulated feedback control signal.

At present, power bipolar junction transistors and pulse transformers are used in the power amplifier stage wherein the low voltage pulses are converted to high voltage pulses. The transformers provide isolation which reduces the amount of switching noise feeding back to the drive circuitry, and provides a low impedance for driving the bipolar junction transistors. This technique has the disadvantage that the transistors themselves require a large amount of base current for operation, thereby causing the idle power of the circuit to be high, with consequent inefficiency of operation.

Another known technique is to utilize power, enhancement mode type Field Effect Transistors (FETs). These FETs, which function as switches, are faster and easier to drive. FETs usually require a gate-to-source voltage of 3-volts or more for operation, and they draw small amounts of gate current. A negative voltage between gate to source is usually required for turning the FET switch OFF. Present techniques utilizing such FETs do not incorporate a pulse transformer between the FET and the driving pulse-width modulation circuit. Therefore, such known circuits usually suffer from noise and component degradation. Another example of a circuit for generating a ringing signal which includes a pulse-width modulator to convert power amplitude signals to pulses of proportionate width is U.S. Pat. No. 4,399,499, entitled "Bi-Lateral Four Quadrant Power Converter", issued Aug. 16, 1983.

SUMMARY OF THE INVENTION

The present invention provides a power drive circuit which is transformer isolated from the circuit developing the drive signals, but which does not lose its DC reference voltage. This technique results in the desired isolation without the undesirable possibility of operating the output transistors in an unsafe DC region, which is a particular problem when the output transistors are FET devices. In accordance with the present invention, pulse transformers are used to drive the power FET devices.

Other objects and advantages of the present invention will become apparent with reference to the accompanying drawings and detailed description thereof, wherein:

DESCRIPTION OF THE PREFERRED EMBODIMENT

Figure 1:
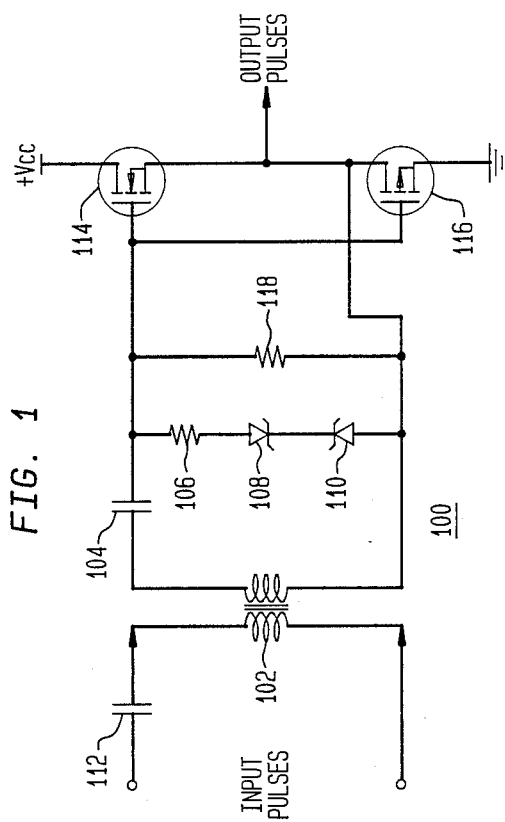
FIG. 1 is an isolated drive FET circuit in accordance with an embodiment of the present invention.
Figure 2A:
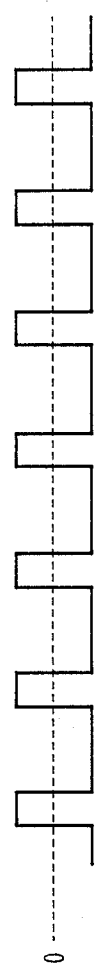
FIGS. 2(a), 2(b), 2(c) and 2(d) are waveform diagrams useful in describing pulse-width modulation circuitry.
Figure 2B:
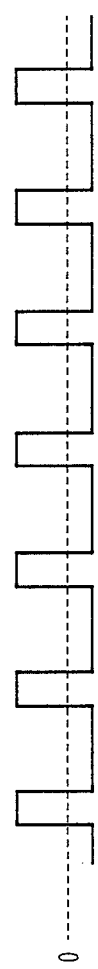
Figure 2C:
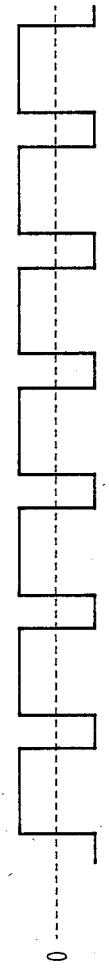
Figure 2D:
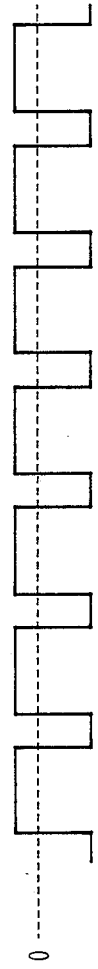

FIG. 1 illustrates an isolated drive circuit at 100 in accordance with the present invention. The drive circuitry associated with a power amplifier should be isolated from the amplifier stages that generate the pulse-width modulated signals. This is frequently accomplished by using a transformer. However, the input pulse train shown by FIG. 2(a) going into the transformer has to be capacitively coupled, unless its duty cycle is fifty percent; otherwise, its dc offset voltage will cause the transformer to saturate. The capacitively coupled transformer, though, causes the incoming pulse train to lose whatever dc component it originally had. FIGS. 2(a) and 2(d) show the effect of capacitively coupled transformers on input pulses where the duty cycle is less than fifty percent; and FIGS. 2(c) and 2(d) show the same effect where the duty cycle is greater than fifty percent.

Transformer saturation is a problem if an FET is to be used at the secondary of a transformer which has an incoming pulse train because the secondary waveform would have its reference voltage level moving, which does not ensure safe operation of the FET. The circuit of FIG. 1 shows how the dc level can be restored at the secondary of the pulse transformer and thus result in a voltage transformation of the incoming pulse train.

Input pulses are capacitively coupled via capacitor 112 to an input transformer 102. Capacitor 104, resistor 106, and zener diodes 108 and 110 comprise a dc restoration circuit. Capacitor 104 functions to block any dc offset that occurs due to referencing the transformer 102 at the sources of FET 114 and FET 116. Resistor 106 and the two equal value zener diode 108 and 110 are located between the gates and sources of FET devices 114 and 116. Resistor 106 functions to limit the current flowing between the zener diodes 108 and 110. In normal operation, a positive going pulse causes zener diode 108 to conduct and zener diode 110 to clamp at its zener voltage, and a negative going pulse causes zener diode 110 to conduct and zener diode 108 to clamp. This results in dc restoration of the pulse train to its original form at the input of the two FETs 114 and 116.

The pulse train coupled to the transformer 102 is equivalent in voltage level to the pulse train at the input of FETs 114 and 116. The operation of the two FETs is as follows: for positive pulses, FET 114 acts as a switch and places +Vcc at the sources of the two FETs. Simultaneously, the positive pulses cause the other FET switch 116, to open. When a negative pulse is present at the FET gates, FET 116 is switched "on" and FET 114 is switched "off". Thus, the input pulse train has its voltage level changed to +Vcc.

The resistor 118 is a critical component in the isolation driver circuit 100. While its value is large and has no effect on the operation of the circuit as long as there is a pulse train present at the input of the transformer 102, if for some reason the pulse train no longer is present, then resistor 118 functions to protect the FETs 114 and 116. If resistor 118 were not present; then under the condition of no pulse train, the gates of the FETs would "flot" and one of the two FETs could conduct.

Figure 3:
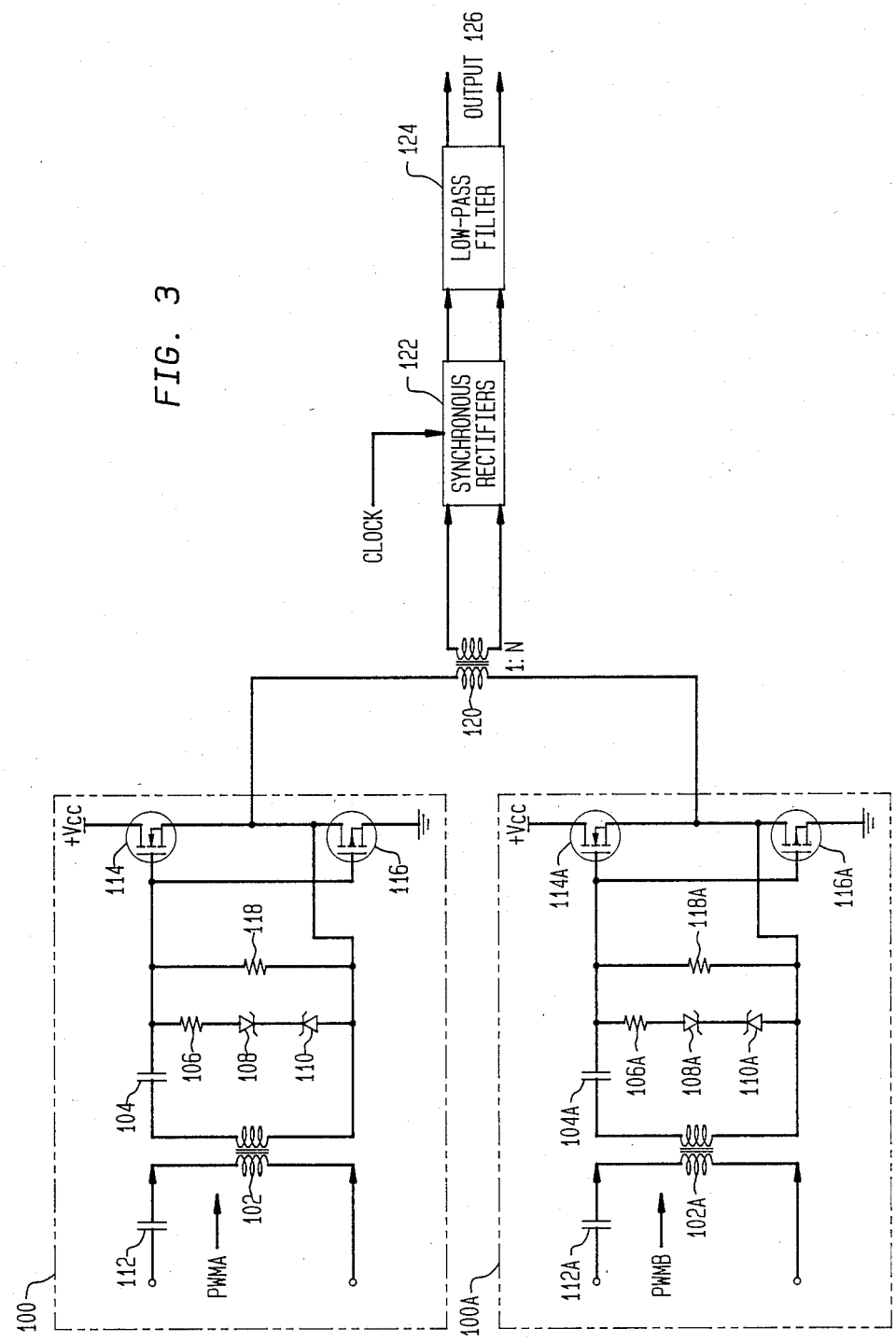
FIG. 3 is a more detailed circuit description of an embodiment of the present invention.

The isolated drive circuit 100 is particularly advantageously utilized to drive another transformer. The embodiment described with reference to FIG. 3, and the corresponding waveform diagrams of FIG. 4 illustrate the use of two isolated drive circuits 100 and 100A to drive a 1:N transformer 120. The component values and circuit configuration of drive circuits 100 and 100A are substantially identical, and operationally correspond to the description thereof provided with reference to FIG. 1 hence identical component values are provided for circuits 100 and 100A.

Figure 4A:
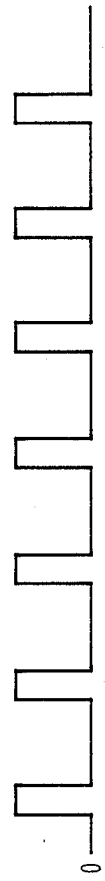
FIGS. 4(a), 4(b), 4(c) and 4(d) are waveform diagrams useful in describing the embodiment of the invention illustrated by FIG. 3.
Figure 4B:
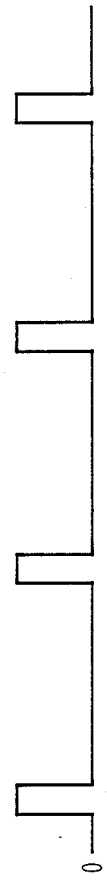
Figure 4C:
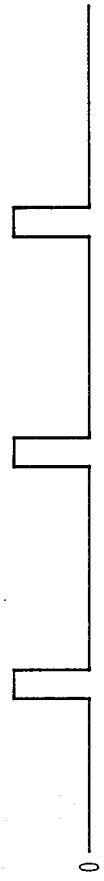
Figure 4D:
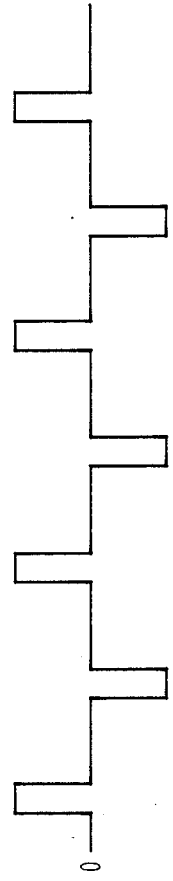

The original PWM shown by FIG. 4(a) is a signal pulse train that is to be amplified. Two signals derived from the original pulse-width modulated signal, PWM A and PWM B are capacitively coupled to isolated drive circuits 100 and 100A respectively. The combination of pulse-width modulated signals PWM A and PWM B are fed into the transformer 120 as a bipolar waveform, which prevents the transformer 120 from saturating because there is no long term dc component. In the illustrated circuit configuration, either FETs 114 and 116A are switched "on" or FETs 116 and 114A are switched "on". The FET switches 114 and 116A are responsible for the positive pulses of the bipolar waveform of FIG. 4(d); and FET switches 116 and 114A are responsible for the negative pulses of the same bipolar waveform. The bipolar signal shown by FIG. 4(d) is transformer coupled to a synchronous rectifier 122 wherein the original PWM signal of FIG. 4(a) is reformed from the bipolar signal of FIG. 4(d). The PWM switching frequency is removed by an output low-pass filter 124 and the amplified original PWM pulse train is output at 126. Resistors 118 and 118A ensure safe operation when the drive signal is no longer present. If resistors 118 and 118A were not included, the gates of the FETs 114, 116, 114A and 116A would float, which could cause FETs 114 and 116A to be turned "on" or FETs 116 and 114A to be turned "on" for an indefinite time duration, which undesirable conditions could result in either the transformer 120 or the FET's or any of them being damaged. Resistors 118 and 118A ensure that all four FET's are "off" when the drive signal is no longer present.

While the present invention has been described in connection with a preferred embodiment thereof, it is to be understood that additional embodiments, modifications and applications which will become obvious to those skilled in the art are included within the spirit and scope of the invention as set forth by the claims appended hereto.

We claim:

1. An isolated drive circuit for a power amplifier, comprising:

input pulse transformer means having PWM input signals with a dc offset voltage capacitively coupled to primary windings thereof;

dc restoration circuit means coupled to a secondary winding of said input transformer means, and having an output;

power FET switching amplifier means for increasing the voltage level of the output of said dc restoration circuit means to a higher voltage level; and resistance means coupled between the gates and sources of said power FET switching amplifier means to prevent the power FET switching amplifier means from conducting when said input PWM pulse train is not present at said input pulse transformer means.

2. An isolated drive circuit in accordance with claim 1 wherein said dc restoration circuit means includes:

capacitor means to block dc offset voltage;

a pair of zener diodes to conduct and clamp positive and negative pulses respectively; and further resistance means in series with said zener diodes to limit the current flowing through said zener diodes;

whereby said PWM input signals are restored to their original form at the output of said dc restoration circuit.

3. An isolated drive circuit in accordance with claim 1 wherein said power FET switching amplifier means comprises a pair of FET devices.

4. An isolated drive circuit in accordance with claim 3 wherein said resistance means prevents the gates of said FET devices from floating under the condition of no pulse train being applied to the primary winding of said input transformer means.

5. In a ringing generator for telecommunications transmission equipment, having a power amplifier stage wherein low voltage PWM pulses at a digital logic level are converted to high voltage pulses, the improvement comprising:

input pulse transformer means having PWM input signals with a dc offset voltage capacitively coupled to primary windings thereof;

dc restoration circuit means coupled to a secondary winding of said input transformer means, and having an output;

power FET switching amplifier means for increasing the voltage level of the output of said dc restoration circuit means to a higher voltage level; and resistance means coupled between the gates and sources of said power FET switching amplifier means to prevent the power FET switching amplifier means from conducting when said input PWM pulse train is not present at said input pulse transformer means.

6. In a power supply having a power amplifier stage wherein low voltage PWM pulses at a digital logic level are converted to high voltage pulses, the improvement comprising:

input pulse transformer means having PWM input signals with a dc offset voltage capacitively coupled to primary windings thereof;

dc restoration circuit means coupled to a secondary winding of said input transformer means, and having an output;

power FET switching amplifier means for increasing the voltage level of the output of said dc restoration circuit means to a higher voltage level; and resistance means coupled between the gates and sources of said power FET switching amplifier means to prevent the power FET switching amplifier means from conducting when said input PWM pulse train is not present at said input pulse transformer means.

7. A pulse width modulated power supply, comprising:

A pair of isolated drive circuits, each of said drive circuits including:

input pulse transformer means having PWM input signals with a dc offset voltage capacitively coupled to primary windings thereof;

dc restoration circuit means coupled to a secondary winding of said input transformer means, and having an output;

power FET switching amplifier means for increasing the voltage level of the output of said dc restoration circuit means to a higher voltage level; and resistance means coupled between the gates and sources of said power FET switching amplifier means to prevent the power FET switching amplifier means from conducting when said input PWM pulse train is not present at said input transformer means;

output transformer means having the outputs of said pair of isolated drive circuits coupled to the primary winding thereof as a bipolar waveform, and having an output;

synchronous rectifier means for reforming the output of said output transformer means into a bipolar signal; and low pass filter means for filtering said bipolar signal.

8. In a ringing generator for telecommunications transmission equipment, having a power amplifier stage including a pair of isolated circuits wherein low voltage PWM pulses at a digital logic level are converted to high voltage pulses, the improvement comprising:

input pulse transformer means having PWM input signals with a dc offset voltage capacitively coupled to primary windings thereof;

dc restoration circuit means coupled to a secondary winding of said input transformer means, and having an output;

power FET switching amplifier means for increasing the voltage level of the output of said dc restoration circuit means to a higher voltage level; and resistance means coupled between the gates and sources of said power FET switching amplifier means to prevent the power FET switching amplifier means from conducting when said input PWM pulse train is not present at said input pulse transformer means;

output transformer means having outputs of said pair of isolated drive circuits coupled to the primary winding thereof as a bipolar waveform, and having an output;

synchronous rectifier means for reforming the output of said output transformer means into a bipolar signal; and low pass filter means for filtering said bipolar signal.

9. An isolated drive circuit in accordance with claim 8 wherein said dc restoration circuit means includes:

capacitor means to block dc offset voltage;

a pair of zener diodes to conduct and clamp positive and negative pulses respectively; and further resistance means in series with said zener diodes to limit the current flowing through said zener diodes;

whereby said PWM input signals are restored to their original form at the output of said dc restoration circuit.

10. An isolated drive circuit in accordance with claim 8 wherein said power FET switching amplifier means comprises a pair of FET devices.

11. An isolated drive circuit in accordance with claim 10 wherein said resistance means prevents the gates of said FET devices from floating under the condition of no pulse train being applied to the primary winding of said input transformer means.

* * * * *